(12) United States Patent
Bhatia (10) Patent No.: US 11,093,714 B1
(45) Date of Patent: Aug. 17, 2021

(54) DYNAMIC TRANSFER LEARNING FOR NEURAL NETWORK MODELING

(71) Applicant: Amazon Technologies, Inc., Seattle, WA (US)

(72) Inventor: Parminder Bhatia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 16/293,459

(22) Filed: Mar. 5, 2019

(51) Int. Cl.
*G06F 40/295* (2020.01)
*G06N 3/08* (2006.01)
*G06N 3/04* (2006.01)

(52) U.S. Cl.
CPC ......... *G06F 40/295* (2020.01); *G06N 3/0454* (2013.01); *G06N 3/084* (2013.01)

(58) Field of Classification Search
CPC ........ G06N 3/0454; G06N 3/084; G06N 3/02; G06N 3/04; G10L 17/18; G06F 40/295
See application file for complete search history.

(56) References Cited

U.S. PATENT DOCUMENTS

| | | | |
|---|---|---|---|
| 2017/0185894 A1* | 6/2017 | Volkovs | G06N 3/08 |
| 2019/0147331 A1* | 5/2019 | Arditi | G05D 1/0274 |
| | | | 706/20 |
| 2019/0251423 A1* | 8/2019 | Shazeer | G06N 3/08 |
| 2019/0251612 A1* | 8/2019 | Fang | G06N 3/08 |

* cited by examiner

*Primary Examiner* — Huyen X Vo
(74) *Attorney, Agent, or Firm* — Knobbe, Martens, Olson & Bear, LLP (57) ABSTRACT

The present disclosure is directed to optimizing transfer learning for neural networks by creating a dynamic transfer network configuration through gated architecture. In some embodiments, transfer learning implements multiple parameter sharing schemes across a source task and a target task. The gating architecture can learn the optimal parameter sharing schemes as the neural network is trained. In some embodiments, the system can be used in named entity recognition applications where the training data is limited.

20 Claims, 7 Drawing Sheets

DYNAMIC TRANSFER LEARNING FOR NEURAL NETWORK MODELING

BACKGROUND

Models representing data relationships and patterns, such as functions, algorithms, systems, and the like, may be implemented as an artificial neural network ("NN"). Artificial neural networks are artificial in the sense that they are computational entities, analogous to biological neural networks in animals, but implemented by computing devices. Output in NN-based models is obtained by doing a "forward pass." The forward pass involves multiplying large NN weight matrices, representing the parameters of the model, by vectors corresponding to input feature vectors or hidden intermediate representations. In recognition systems, such as systems designed to recognize speech, handwriting, faces, and the like, NN-based models may generate probability scores via the forward pass. The probability scores may indicate the probability that the input corresponds to a particular label, class, or the like.

The parameters of a NN can be set in a process referred to as training. For example, a NN-based model can be trained using training data that includes input data and the correct or preferred output of the model for the corresponding input data. The NN can repeatedly process the input data, and the parameters (e.g., the weight matrices) of the NN can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

In some cases, transfer learning can be used to set the parameters of a NN by sharing parameters with a different NN, such as a NN for which a large training dataset of related data exists. Transfer learning leverages overlapping representations between a target task and a source task to build a NN for the target task even if the task has limited training data. Transfer learning can be conducted under various parameter sharing schemes—for example, hard-sharing and soft-sharing schemes.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to generating an artificial neural network by determining a preferred or optimal parameter sharing configuration for sharing (or not sharing) parameters with another artificial neural network. The preferred or optimal parameter sharing configuration may be determined through the use of dynamic transfer networks. Dynamic transfer networks can use a plurality of gating mechanisms or functions to combine various parameter sharing schemes and generate the optimal parameter sharing configuration. Thus, the systems and methods described herein provide efficient transfer learning for artificial neural networks with limited training resources by obviating or otherwise reducing the need to train numerous artificial networks under different parameter sharing configurations. Such efficiently generated artificial neural networks may be used in a variety of machine learning applications and other systems, including but not limited to: clinical notes recognition, product recommendation generation, automatic speech recognition, facial recognition, handwriting recognition, and image recognition.

Generally described, artificial neural networks (NNs), including but not limited to deep neural networks (DNNs), have multiple layers of nodes. Illustratively, a NN may include an input layer, an output layer, and any number of intermediate or "hidden" layers between the input and output layers. The individual layers may include any number of separate nodes. Nodes of adjacent layers may be connected to each other, and each connection between the various nodes of adjacent layers may be associated with a respective trainable parameter or "weight." Conceptually, a node may be thought of as a computational unit that computes an output value as a function of a plurality of different input values. The input values may include the output of nodes in a previous layer, multiplied by weights associated with connections between the nodes in the previous layer and the current node. When a NN processes input data in the form of a matrix of input vectors (e.g., a batch of training data input vectors), the NN may perform a "forward pass" to generate a matrix of output vectors. The input vectors may each include n separate data elements or "dimensions," corresponding to the n nodes of the NN input layer (where n is some positive integer). Each data element may be a value, such as a floating-point number or integer. The forward pass includes multiplying the matrix of input vectors by a matrix representing the weights associated with connections between the nodes of the input layer and nodes of the next layer, and applying an activation function to the results. The process is then repeated for each subsequent NN layer.

Systems using neural network architectures can contain various components that are each modeled by a neural network. For example, a named entity recognition (NER) system can have three main components: a character encoder, a word encoder, and a decoder/tagger. The parameters, or weight matrices, for the neural networks representing each component can be determined during a training process that typically uses large amounts of training data. In cases where there is a limited training dataset to adequately train the neural network parameters, transfer learning can be used to set the parameters. Transfer learning can train two different neural-network-based components or "tasks"-a target task with a limited training dataset and a source task with sufficiently large training dataset—by sharing parameters between the two tasks. In some instances, the two tasks can be trained simultaneously. In some instances, the source task can be trained first and the parameters for the target tasks can be derived from the source task parameters.

Transfer learning can be implemented using various parameter sharing schemes. For example, transfer learning can be implemented using independent parameters, hard-sharing, or soft-sharing schemes. In an independent parameter scheme, the parameter values for the target task are set and updated independent of any updates to corresponding parameter values in the source task, and vice versa. Thus, the network performs no transfer learning across the target and the source tasks. For some components, the model can perform best when no shared knowledge exists. In a hard-sharing scheme, the parameters of both target and source tasks reference the same set of parameters, and training each task updates the values for the same parameters. In a soft-sharing scheme, individual sets of parameters are given to both source and target tasks, but the values of parameters for the source task are set and updated based at least partially on the values of corresponding parameters for the target task, and vice versa. For example, the distance between the corresponding parameter values is minimized as a form of regularization. Soft-sharing schemes couple corresponding parameters to one another while allowing for more freedom than hard sharing, hence enabling the tasks to choose what sections of their parameters space to share. A NER system or other systems using neural network architectures can implement different parameter sharing schemes for each of the components that comprise the system. As an example, a NER system can employ independent parameters for the character encoder, hard-sharing scheme for the word encoder, and hard-sharing for the decoder.

Conventional methods of determining an optimal parameter sharing configuration for transfer learning requires training the neural network with every permutation of component and sharing scheme. Then, the configuration that performed the best is selected. Thus, if there are M number of sharing schemes and N number of components, optimizing the configuration requires training $M^N$ unique models (e.g., in NER systems with 3 components and 3 sharing schemes, 27 different models would need to be trained). The present disclosure relates to systems and methods for generating an optimal parameter sharing configuration that requires training only one model. Thus, the systems and methods presently disclosed can build neural networks in limited resource domains with less computing resources, improving the speed and efficiency of systems implementing neural network architecture. With conventional methods of determining optimal parameter sharing configuration, the total time to train can increase exponentially as additional components and/or sharing schemes are added. For example, the total time can be $M^N$ times longer than training a single neural network (e.g. 27 times longer in NER systems with 3 components and 3 sharing schemes). In some embodiments, the total time to train a neural network via dynamic transfer networks can be significantly less than conventional methods. For example, the total time to train may increase only linearly or logarithmically as additional components and sharing schemes are used (e.g., it may take 1.6 times longer than training a single neural network to train an NER system with 3 components and 3 sharing schemes).

Some aspects of the present disclosure relate to a dynamic transfer network wherein gating mechanisms or functions are used to combine various parameter sharing schemes and determine an optimal parameter sharing configuration. In a dynamic transfer network, target and source inputs are propagated via a forward pass through their respective neural networks which employ various parameter sharing schemes in parallel. In some embodiments, a forward pass through the dynamic transfer network produces latent representations corresponding to each input and each sharing scheme. The dynamic transfer network uses gating mechanisms or functions to combine the latent representations to produce a combined representation which can be used to modify the network parameters. In some embodiments, the dynamic transfer network uses multi-stage gating mechanisms to combine the latent representations corresponding to hard and soft sharing schemes and then combine latent representations corresponding to sharing schemes and independent parameters. A gating mechanism can be represented by a gating function with trainable parameters. The parameters for the gating mechanism can be trained as the overall neural network architecture is trained. When the model converges, the gating function parameters can signify the optimal combination of the various sharing schemes.

Additional aspects of the present disclosure relate to implementation of dynamic transfer networks into systems for which a sufficient amount of task-specific training data may not exist or may not be readily available. For example, the dynamic transfer networks and training methods described herein may be used to train NER systems for medical and clinical notes recognition. The medical text domain is a particularly difficult domain in which to generate models due to the limited availability of training data. First, there is a dearth of publicly available datasets for medical and clinical text because of privacy concerns. Moreover, datasets across medical specialties cannot be aggregated without difficulty because there is a high degree of variance in vocabulary used across medical specialties. Similarly, standard NER datasets which often focus on newswire data cannot be solely relied upon because clinicians often use shorthand or abbreviations to produce patient release notes with irregular grammar. Therefore, dynamic transfer networks are beneficial to NER systems in the medical domain because dynamic transfer networks can diminish the effect of limited datasets and leverage overlapping representation across specialties.

For example, dynamic transfer networks can be used to train a NER system for a limited dataset such as patient records. In such embodiments, the target task can be labeling named entities in patient records and the source task can be labeling named entities in medication data or non-medical newswire data. By integrating the target and source tasks into a dynamic transfer network, the NER system can be trained and the parameters for the target task can be determined. In some embodiments, the target and source inputs are combined and inputted as batches in random order, thereby interleaving the training of both the target and the source task into a single training process. In some embodiments, the source task is trained before the target source is trained. After the target task has been trained, an input, such as a new patient record, can be propagated through the NER system via a forward pass and the NER system can tag or label portions of the patient record with the appropriate entity label. For example, the NER system can identify portions of the input as "test", "treatment", or "problem."

Various aspects of the disclosure will now be described with regard to certain examples and embodiments, which are intended to illustrate but not limit the disclosure. Although the examples and embodiments described herein will focus, for the purpose of illustration, on dynamic transfer networks in named entity recognition systems that process particular types of data such as medical data, the examples are illustrative only and are not intended to be limiting. In some embodiments, dynamic transfer networks can be applied to named entity systems that process other types of data, to systems that perform tasks other than named entity tagging, or to neural network systems generally. In some embodiments, dynamic transfer networks can be applied to tasks across multiple languages.

Example Configuration of Dynamic Transfer Network

Figure 1:
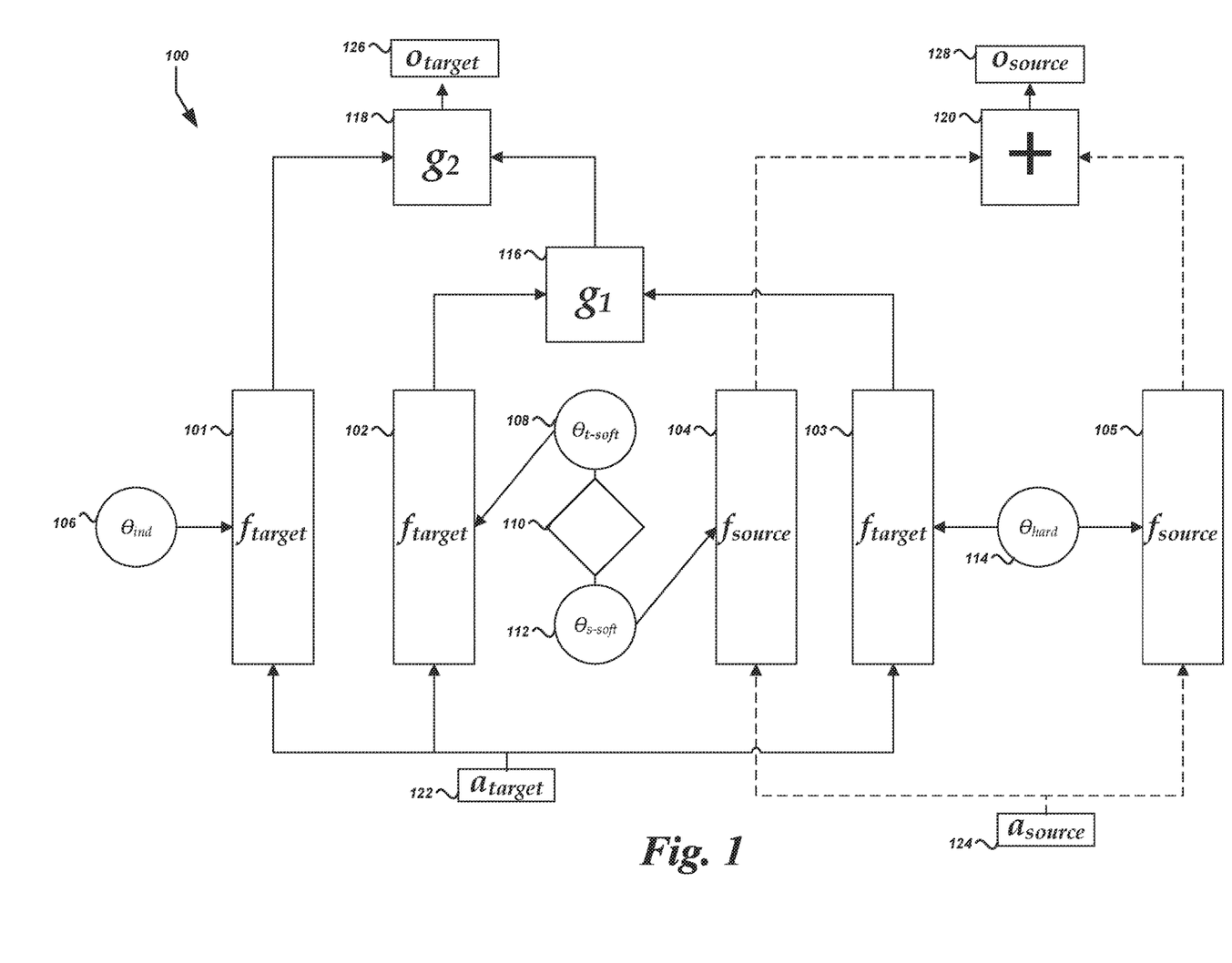
FIG. 1 is a block diagram of an illustrative dynamic transfer network 100 configured to train a neural network for a target task while determining the optimal configuration for sharing parameters between the target task and a source task.

FIG. 1 is a block diagram of an illustrative dynamic transfer network 100 configured to train a neural network for a target task while determining the optimal configuration for sharing parameters between the target task and a source task. As depicted in in FIG. 1, target input 122 ($a_{target}$) is passed through the dynamic transfer network 100 to generate a target output 126 ($o_{target}$). In addition, source input 124 ($a_{source}$) is passed through the dynamic transfer network 100 to generate a source output 128 ($o_{source}$). The target input 122 may be an input vector or batch of vectors from a training dataset that is tailored to the target task. The source input 124 may be an input vector or batch of vectors from a training dataset that tailored to the source task. The target task and source task (and therefore the training data for the target task and source task) may be related such that the learning that occurs when training the source task can be leveraged to improve the training of the target task. For example, the source task may relate to NER labelling of medical documents generally, while the target task may relate to NER labelling of documents in a particular medical specialty, such as a specialty for which a sufficient corpus of training data is not readily available.

The neural networks 101, 102, 103 represent a target task $f_{target}$. In some embodiments, neural networks 101, 102, 103 are copies or versions of a single neural network. Neural network 101 includes parameters $\theta_{ind}$ 106. Neural network 102 includes parameters $\theta_{t-soft}$ 108. Neural network 103 includes parameters $\theta_{hard}$ 114. The neural networks 104, 105 represent a source task $f_{source}$. Neural network 104 includes parameters $\theta_{s-soft}$ 112. Neural network 105 includes parameters $\theta_{hard}$ 114. In some embodiments, neural networks 104, 105 are copies or versions of a single neural network. In some embodiments, neural networks 103 and 105 are not copies of a neural network with different parameter sets, but are instead the same neural network with a single set of parameters. In this way, the parameters may only be maintained and updated in one location, and the updates are reflected in both the target task and source task.

In some embodiments, the neural networks 101, 102, 103, 104, 105 have the same architecture. For example, the neural networks 101, 102, 103, 104, 105 may each have the same number of layers, the same number of nodes per layer, etc. Individual parameters of one network may directly correspond to individual parameters of another network such that there is a 1-to-1 relationship between parameters of the various neural networks. The target and source inputs 122, 124 can be passed through the neural networks 101, 102, 103, 104, 105 using parameters 106, 108, 112, 114 to create latent representations.

Parameters $\theta_{t-soft}$ 108 and parameters $\theta_{s-soft}$ 112 are generated using a soft sharing mechanism 110. Separate parameters $\theta_{t-soft}$ 108 and parameters $\theta_{s-soft}$ 112 are used for target neural network 102 and source neural network 104, respectively. The soft-sharing mechanism 110 couples parameters $\theta_{t-soft}$ 108 and parameters $\theta_{s-soft}$ 112 so that the values of individual parameters in parameters $\theta_{t-soft}$ 108 are based at least partly on values of corresponding individual parameters in parameters $\theta_{s-soft}$ 112. For example, the distance between the corresponding parameters is minimized. In some embodiments, soft-sharing scheme 110 uses an objective function $L_{share} = \mu \|\theta_{s-soft} - \theta_{t-soft}\|_2^2$ that is minimized as a form of regularization in the training process 500 depicted in FIG. 5. Parameters $\theta_{hard}$ 114 are shared by the target neural network 103 and target neural network 105. For example, values of individual parameters in $\theta_{hard}$ 114 that are modified during training of one task are then used by the other task, and vice versa. In some embodiments, such sharing scheme can be referred to as hard-sharing. Parameters $\theta_{ind}$ 106 are generated independent of the source task. For example, any changes to values of individual parameters $\theta_{ind}$ 106 have no effect on the source task. Thus, parameters $\theta_{ind}$ 106 are not used by source neural networks 104, 105.

In FIG. 1, the solid lines represent data flows of the target task. The target input 122 is passed through the neural network 102 using parameters $\theta_{t-soft}$ 108 and the neural network 103 using parameters $\theta_{hard}$ 114. The output of neural network 102 and output of the neural network 103 are combined by the gating mechanism $g_1$ 116. The gating mechanism $g_1$ 116 combines the output of the neural network 102 generated using parameters $\theta_{t-soft}$ 108 and the output of the neural network 103 generated using parameters $\theta_{hard}$ 114 according to one or more weighting values that optimize the model. The gating mechanism $g_1$ 116 can be represented by a function with parameters that are trained during the neural network training process 500. In some embodiments, the gating mechanism $g_1$ 116 can combine latent representations $h_{t-hard}$ and $h_{t-soft}$ to produce output $o_{shared}$ according to equations [1] and [2] below:

$$g_1 = \sigma(Q^T h_{t-soft} + R^T h_{t-hard} + S^T a_{target} + b_{g_1}) \quad [1]$$

$$o_{shared} = (1-g_1) h_{t-hard} + g_1 \cdot h_{t-soft} \quad [2]$$

wherein Q, R, S, and $b_{g_1}$ are trainable parameters (e.g., trained during process 500) and σ represents the sigmoid function. Q, R, and S may be referred to as "transformation parameters," and $b_{g_1}$ may be referred to as a "bias factor." In some embodiments, Q, R, and S may be matrices that are applied to the corresponding representations $h_{t-soft}$, $h_{t-hard}$, and $a_{target}$ respectively according to equation [1]. This may be done to "transform" or "map" the representations into a common space. In some embodiments, $b_{g_1}$ is set equal to zero and remains zero throughout the training process.

In one specific, non-limiting embodiment, Q, R, and S may be m by n matrices wherein m=1 (indicating the matrix has 1 row) and n=the number of dimensions of the corresponding representation (indicating the matrix has the same number of columns as the number of dimensions in the corresponding representation). The transpose of each matrix Q, R, and S is used in equation [1]. By computing the dot product of the transpose of each matrix and its corresponding representation, the result is a scalar value. Illustratively, $h_{t-soft}$ may be a 300-dimension vector, and Q may be a matrix with 1 row and 300 columns. The dot product of $Q^T h_{t-soft}$ is a scalar value. The same process may apply to R and S, and their corresponding representations $h_{t-hard}$ and $a_{target}$ respectively. Once the matrices have been applied to the representations to map the representations into the same space and produce scalar values, the values can be added or otherwise manipulated accordingly. It will be appreciated that the number dimensions in this example is for purposes of illustration only, and is not intended to limiting. In practice, the number of dimensions of any of the representations may be more or less than the number in this example, and may be more or less than any other representation used in the equations, depending upon the design of the neural network.

The output of equation [1], assigned to $g_1$ above, is used to weight the representations generated using the different sharing schemes, when those representations are combined into $o_{shared}$. As shown in equation [2], the value $g_1$ is the weight given to the representation generated using a first parameter sharing scheme, while the value $1-g_1$ is the weight given to the representation generated using a second parameter sharing scheme. The products of the respective weighting values and representations are added to produce the overall representation generated using parameter sharing, $o_{shared}$. In this way, a neural network can use multiple sharing configurations and integrate them using learned weights that have been optimized or otherwise determined empirically for the specific task. This flexible sharing represents an improvement over the rigidity of conventional systems in which one parameter sharing scheme or another is used at any given time.

The target input 122 is also passed through the neural network 101 using parameters $\theta_{ind}$ 106, which are independent from any source task parameters. The output of the gating mechanism $g_1$ 116 and the output of the neural network 101 generated using parameters $\theta_{ind}$ 106 are combined by the gating mechanism $g_2$ 118 to produce the target output 126 of the dynamic transfer network 100. The gating mechanism $g_2$ 118 combines the output of the gating mechanism $g_1$ 116 and the output of the neural network 101 generated using parameters $\theta_{ind}$ 106 according to one or more weighting values that optimize the model. The gating mechanism $g_2$ 118 can be represented by a function with parameters that are trained during the neural network training process 500. In some embodiments, the gating mechanism $g_2$ 118 combines $o_{shared}$ and latent representation $h_{ind}$ to produce $o_{target}$ according to equations [3] and [4] below:

$$g_2 = \sigma(T^T h_{ind} + U^T o_{shared} + V^T a_{target} + b_{g_2}) \quad [3]$$

$$o_{target} = (1-g_2) h_{ind} + g_2 \cdot o_{shared} \quad [4]$$

wherein T, U, V, and $b_{g_2}$ are trainable parameters (e.g., trained during process 500) and $\sigma$ represents the sigmoid function. T, U, and V may be referred to as "transformation parameters," and $b_{g_2}$ may be referred to as a "bias factor." T, U, and V may be matrices that are applied to the corresponding representations $h_{ind}$, $o_{shared}$, and $a_{target}$ respectively according to equation [3]. This may be done to transform or map the representations into a common space. In some embodiments, $b_{g_2}$ is set equal to zero and remains zero throughout the training process.

In one specific, non-limiting embodiment, T, U, and V may be m by n matrices wherein m=1 and n=the number of dimensions of the corresponding representation, as discussed above with respect to equation [1]. By computing the dot product of the transpose of each matrix and its corresponding representation, the result is a scalar value. Once the matrices have been applied to the representations to map the representations into the same space and produce scalar values, the values can be added or otherwise manipulated accordingly.

The output of equation [3], assigned to $g_2$ above, is used to weight the representation generated independently of any source task parameters, and the composite representation generated using multiple parameter sharing schemes. As shown in equation [4], the value $g_2$ is the weight given to the composite representation generated using multiple parameter sharing schemes, while the value $1-g_2$ is the weight given to the representation generated independently of any source task parameters. The products of the respective weighting values and representations are added to produce the overall representation of the target task, $o_{target}$. In this way, a neural network can use both independent parameters and parameters trained using various sharing schemes with a source task. The neural network can integrate the results of each scheme using learned weights that have been optimized or otherwise determined empirically for the specific task. This flexible sharing represents an improvement over the rigidity of conventional systems in which one parameter sharing scheme or another is used at any given time.

In FIG. 1, the dashed lines represent data flows of the source task. The source input 124 may be passed through the neural network 104 using parameters $\theta_{s-soft}$ 112 and the neural network 105 using parameters $\theta_{hard}$ 114. The output of the neural network 104 generated using parameters $\theta_{s-soft}$ 112 and the output of the neural network 105 generated using parameters $\theta_{hard}$ 114 may be combined (e.g., by an adder 120) to generate source output 128.

Figure 2:
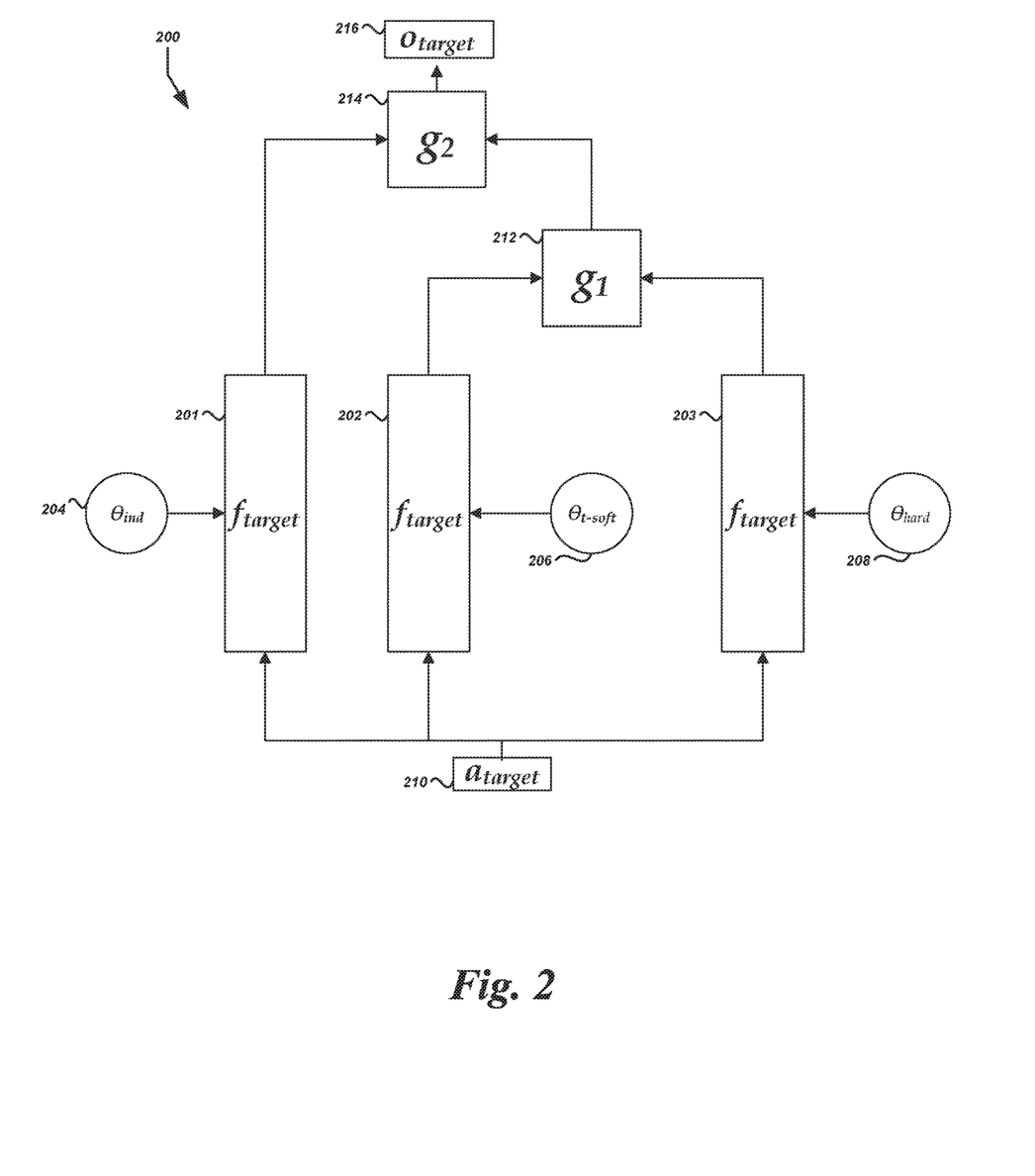
FIG. 2 is a block diagram of an illustrative dynamic transfer network when the training is complete.

FIG. 2 is a block diagram of an illustrative dynamic transfer network 200 when the training is complete. As depicted in FIG. 2, an output vector 216 ($o_{target}$) can be generated by performing a forward pass of the input vector 210 ($a_{target}$) through the trained dynamic transfer network 200. In some embodiments, the output vector 216 can comprise probability scores that indicate the probability that the input corresponds to a particular label, class, or the like.

The trained dynamic transfer network 200 can comprise neural networks 201, 202, 203 corresponding to the target task $f_{target}$. Neural network 201 includes parameters $\theta_{ind}$ 204. Neural network 202 includes parameters $\theta_{t-soft}$ 206. Neural network 203 includes parameters $\theta_{hard}$ 208. The input vector 210 can be passed through the neural networks 201, 202, 203 using parameters 204, 206, 208 to create latent representations, or sub-output. Though FIG. 2 depicts the neural networks 201, 202, 203 as separate components, in some embodiments, the neural networks 201, 202, 203 can be thought of as different portions of a single network using multiple parameter matrices.

In some embodiments, target parameters $\theta_{ind}$ 204 can be obtained by training the parameters independent of the source parameters. In some embodiments, target parameters $\theta_{soft}$ 206 can be obtained by training the parameters according to a soft sharing scheme. In some embodiments, target parameters $\theta_{hard}$ 208 can be obtained by training the parameters according to a hard sharing scheme.

Figure 5:
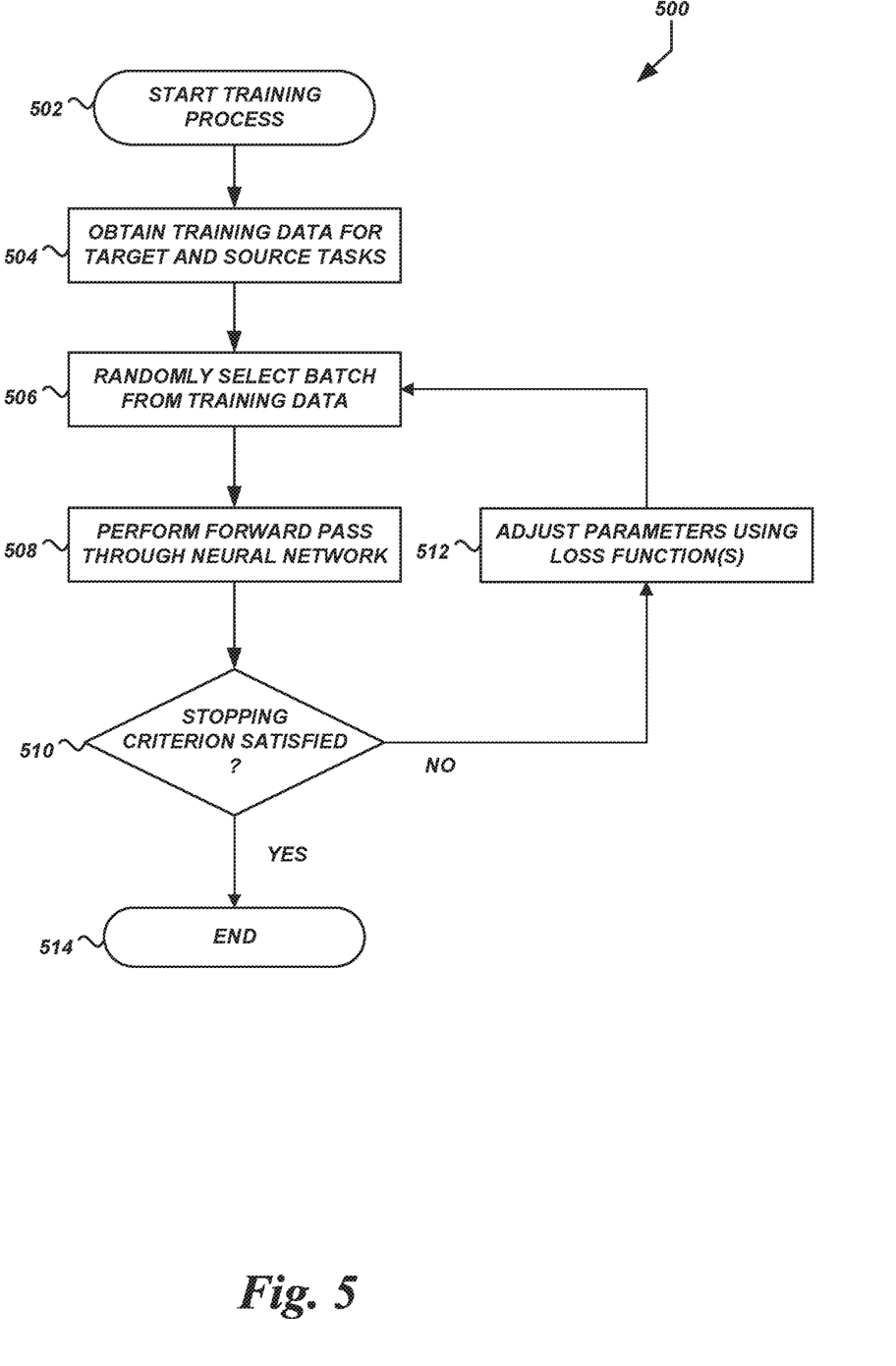
FIG. 5 is a flow diagram of an illustrative process for training a dynamic transfer network.

The latent representation of the neural network 202 generated using parameters $\theta_{soft}$ 206 and the latent representation of the neural network 203 generated using parameters $\theta_{hard}$ 208 are combined by the gating mechanism $g_1$ 212. The gating mechanism $g_1$ 212 combines the latent representation of the neural network 202 generated using parameters $\theta_{soft}$ 206 and latent representation of the neural network 203 generated using parameters $\theta_{hard}$ 208 according to one or more weighting values. The gating mechanism $g_1$ 212 can be represented by a function with parameters that are trained during the neural network training process 500 as depicted in FIG. 5. In some embodiments, the gating mechanism $g_1$ 212 can combine latent representations $h_{t-hard}$ and $h_{t-soft}$ to produce output $o_{shared}$ according to equations [1] and [2] discussed above, using the learned values of Q, R, S, and $b_{g_1}$.

The output of the gating mechanism $g_1$ 212 and the latent representation of the neural network 201 generated using parameters $\theta_{ind}$ 204 are combined by the gating mechanism $g_2$ 216 to produce the output 216 of the dynamic transfer network 200. The gating mechanism $g_2$ 216 combines the output of the gating mechanism $g_1$ 212 and the latent representation of the neural network 201 parameters $\theta_{ind}$ 204 according to one or more weighting values. The gating mechanism $g_2$ 216 can be represented by a function with parameters that are trained during the neural network training process 500. In some embodiments, the gating mechanism $g_2$ 216 combines $o_{shared}$ and latent representation $h_{ind}$ to produce $o_{target}$ according to equations [3] and [4] discussed above, using the learned values of T, U, V, and $b_{g_2}$.

Figure 3:
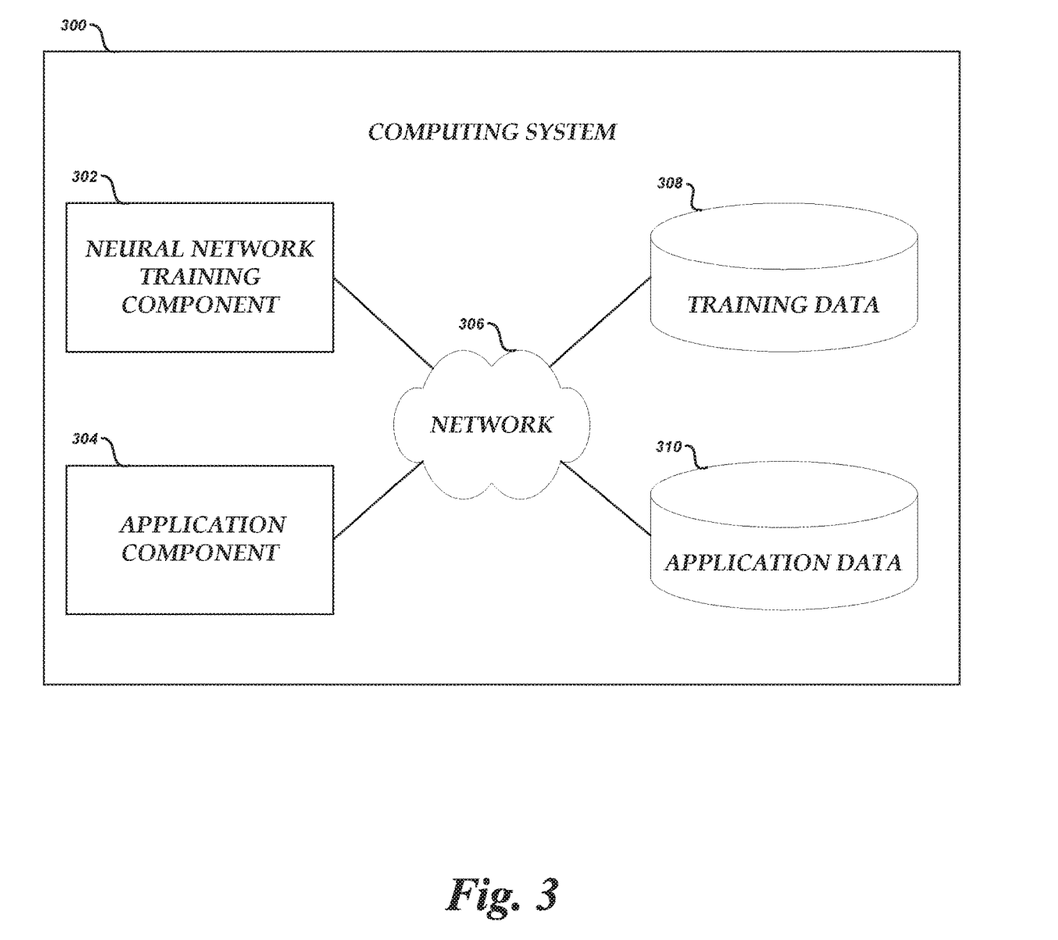
FIG. 3 is a block diagram of an illustrative computing system configured to train neural networks and to perform tasks.
Figure 7:
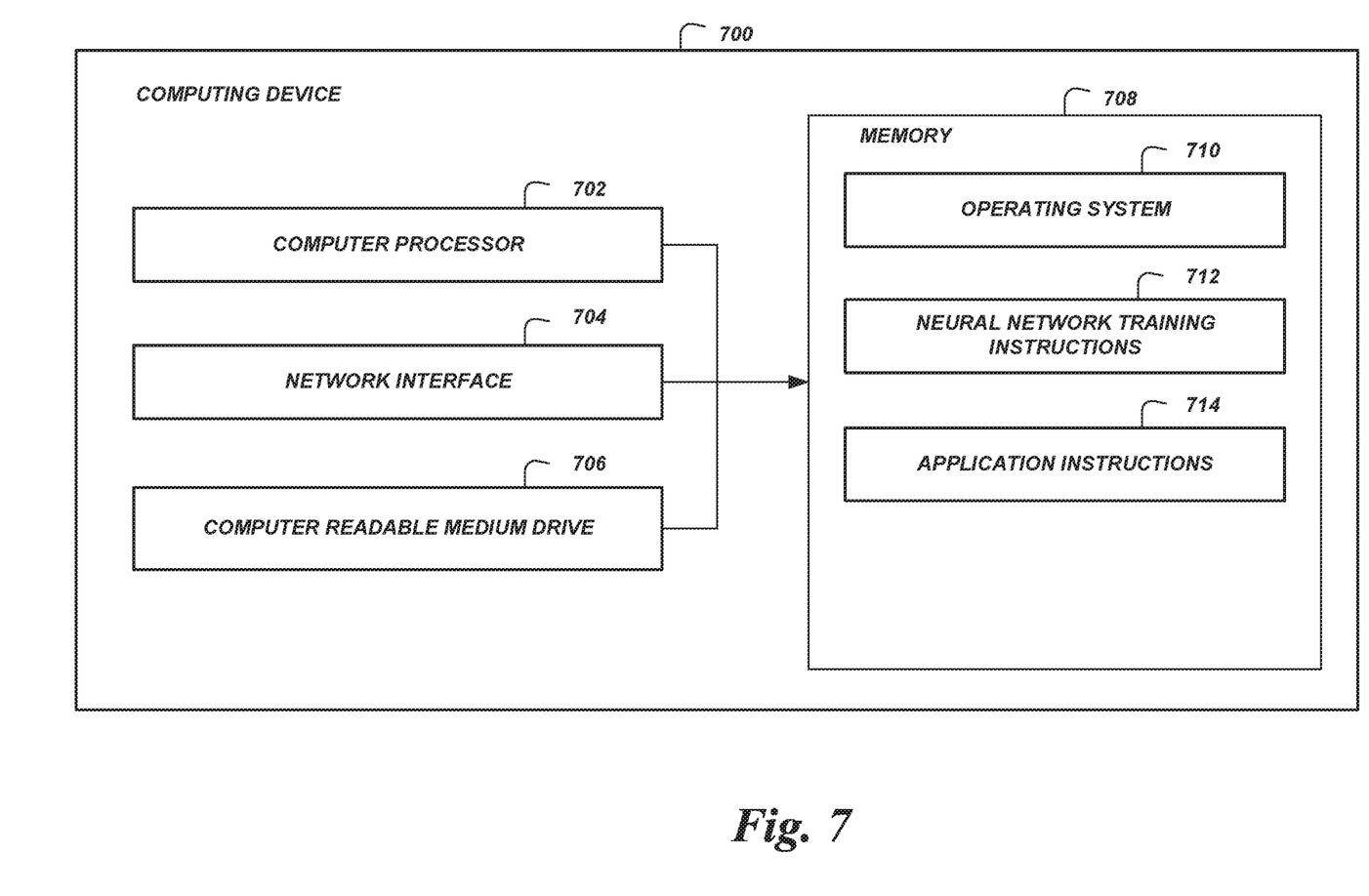
FIG. 7 is block diagram of various components of a computing device according to some embodiments.

FIG. 3 is a block diagram of an illustrative computing system 300 configured to train neural networks and to use the neural networks to perform tasks. The computing system 300 includes various components, data stores, and the like for providing features described herein. The computing system 300 shown in FIG. 3 comprises a neural training component 302 and an application component 304. In some embodiments, the neural training component 302 and/or the application component 304 are connected to a training database 308 and/or an application database 310 via a network 306. In some embodiments, the network 306 may be a private network such as local area network (LAN) or a wide area network (WAN), a public network such as the Internet, another network, or some combination thereof. In some embodiments, all or some of the components and database can be implemented on multiple separate computing devices 700 as depicted in FIG. 7. In some embodiments, a single computing device 700 can comprise the neural network training component 302, the application component 304, the training database 308, the application database 310, or some combination thereof.

The neural network training component 302 may be configured to train the neural networks for various tasks. In some embodiments, the neural network training component 302 trains a neural network or combination of neural networks via dynamic transfer networks. In some embodiments, the neural network training component 302 obtains training data for the target and source tasks from the training database 308. In some embodiments, the trained neural network and/or the parameters associated with the neural network can be stored in the application database 310.

The application component 304 may be configured to perform various tasks using neural networks. In some embodiments, the task can be named entity recognition, clinical notes recognition, product recommendation generation, automatic speech recognition, facial recognition, handwriting recognition, image recognition, other machine learning applications, or some combination thereof. In some embodiments, the application component 304 can receive data for a target task. In some embodiments, the application component 304 can receive an input dataset that is to be labeled. In such embodiments, the application component 304 can store the received input dataset in the application database 310. The application database 310 can store configuration information for certain applications. For example, if the application is one of named entity recognition, the application database 310 can store configuration information such as NER system comprising a character encoder, a word encoder, and a decoder/tagger. In some embodiments, the application database 310 can store input and output data used in the application component 304. In some embodiments, the application database stores the trained neural network for a target task. In some embodiments, the application component 304 obtains the trained neural network, such as the trained dynamic transfer network 200 shown in FIG. 2, for a target task and uses the neural network to perform tasks on the input dataset.

As a non-limiting example, the application component 304 can be configured to perform the task of labeling patient records. In such embodiments, the model used by the application component 304 may have been trained using a dynamic transfer network in which the target task can be labeling patient records and the source task can be labeling medication data or non-medical newswire data. In such embodiments, the application component 304 can identify portions of patient records as "test", "treatment", or "problem." In some embodiments, the application component 302 generates a graphical user interface (GUI) configured to display the labeled patient records. In some embodiments, the application component 302 additionally and/or alternatively stores labeled patient records in the application database 310, transmits the labeled patient records to another system, etc.

Example Named Entity Recognition System with Dynamic Transfer Networks

Figure 4:
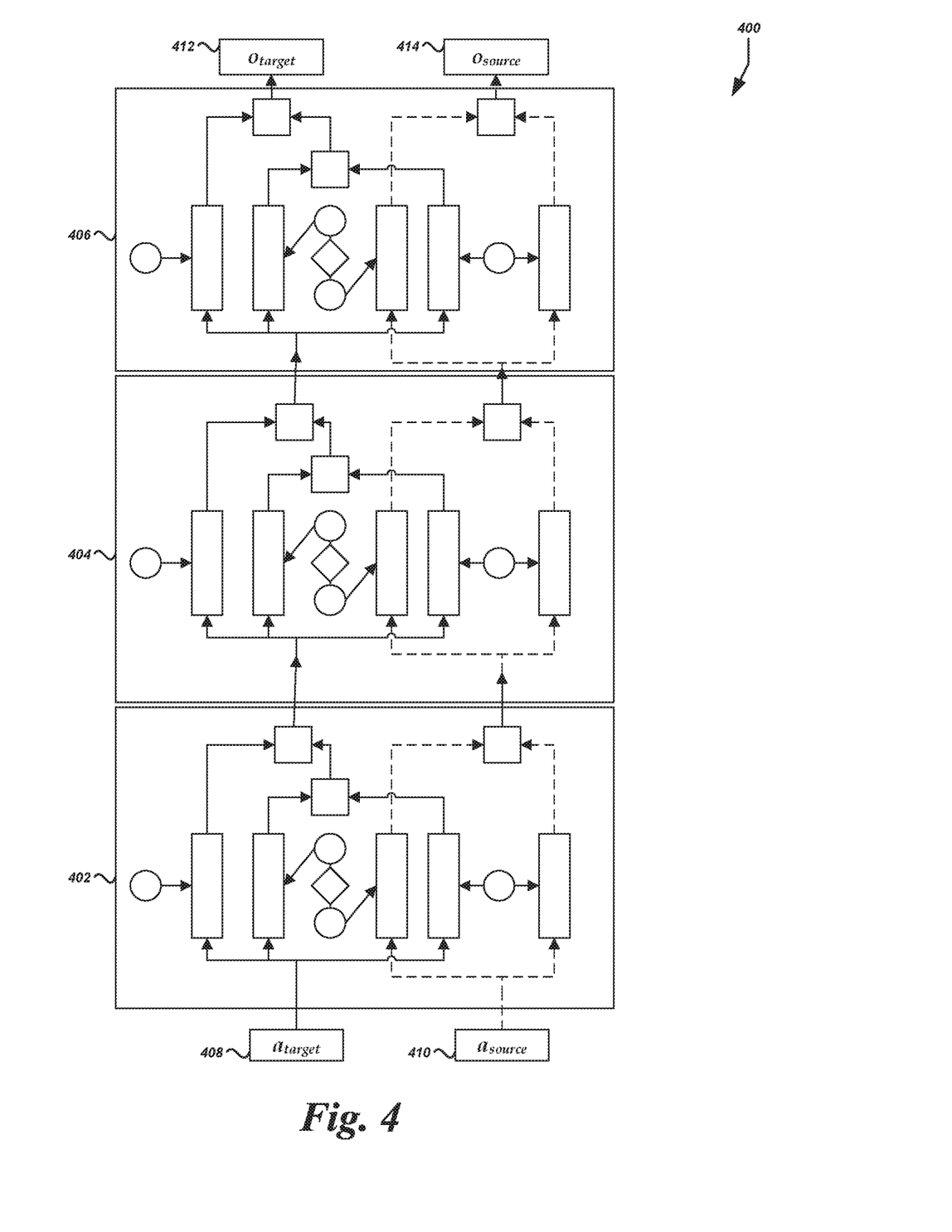
FIG. 4 is a block diagram of an illustrative named entity recognition system.

FIG. 4 is a block diagram of an illustrative named entity recognition (NER) system 400. The NER system 400 can comprise a character encoder 402, a word encoder 404, and a decoder/tagger 406. In some embodiments, the NER system 400 can comprise additional components. In some embodiments, the character encoder 402, the word encoder 406, and the decoder/tagger 406 can be implemented by a set of executable program instructions stored on a non-transitory computer-readable medium, such as one or more disk drives, of a computing device, such as the computing device 700 shown in FIG. 7 and described in greater detail below. In some embodiments, the character encoder 402, the word encoder 406, and the decoder/tagger 406 can be implemented on multiple separate computing devices. As depicted in FIG. 4, the inputs for the character encoder 402 are the target input 408 and source input 410. In some embodiments, the target input 408 and source input 410 are the outputs of a component. The outputs of the character encoder 402 becomes the inputs of the word encoder 404, and the outputs of the word encoder 404 becomes the inputs of the decoder/tagger 406. The outputs of the decoder/tagger 406 are the target output 412 and source output 414. As depicted in FIG. 4, each component can be implemented using a dynamic transfer network. In some embodiments, certain components of the NER system 400 may not be implemented using a dynamic transfer network.

In some embodiments, the character encoder 402 can employ bi-directional Long Short Term Memory (LSTM) units that produce a forward and backward hidden representations $\overrightarrow{h_{1:l}^{(t)}}$ and $\overleftarrow{h_{1:l}^{(t)}}$, where l is the last time step in both sequences. The last time step of each of the hidden representations can be concatenated to generate a final encoded representation at the character level as represented by function [5]:

$$h_c^{(t)} = [\overrightarrow{h_{1:l}^{(t)}} \| \overleftarrow{h_{1:l}^{(t)}}] \qquad [5].$$

In some embodiments, the word encoder 404 can use bidirectional LSTM to encode a sequence at the word level. In some embodiments, the output of the character encoder 402 is concatenated with a pre-trained word embedding as represented by function [6]:

$$m_t = [h_c^{(t)} \| emb_{word}(x_t)] \qquad [6].$$

The concatenated output of the word encoder 404 can be the input for the decoder/tagger 406. In some embodiments, the decoder/tagger 406 can use a uni-directional LSTM.

During training, the decoder/tagger 406 can use teacher forcing to provide the gold standard label as part of the input. In some embodiments, the decoder/tagger 406 can be represented by functions [7] and [8]:

$$o_t = \text{LSTM}(0_{t-1}, [h_t \| \hat{y}_{t-1}]) \quad [7]$$

$$\hat{y}_t = \text{softmax}(Wo_t + b^s), \quad [8]$$

wherein $W \in \mathbb{R}^{d \times n}$, d is the number of units in the decoder LSTM, and n is the number of tags. The decoder/tagger 406 can be trained in an end to end fashion using a cross-entropy objective function. In some embodiments, the character encoder 402 and the word encoder 404 can be modeled by convolutional and/or recurrent networks with either conditional random fields or single directional neural networks employed as the decoder/tagger 406.

Example Process for Training a Dynamic Transfer Network

FIG. 5 is a flow diagram of an illustrative process for training a dynamic transfer network. The process 500 may be embodied in a set of executable program instructions stored on a non-transitory computer-readable medium, such as one or more disk drives, of a computing device, such as the computing device 700 shown in FIG. 7 and described in greater detail below. When the process 500 is initiated, the executable program instructions can be loaded into memory, such as RAM, and executed by one or more processors of the computing device 700. Although the process 500 is described with respect to the computing device 700 shown in FIG. 7, the description is illustrative only and is not intended to be limiting. In some embodiments, the process 500 or portions thereof may be performed in parallel by multiple separate computing devices instead of, or in addition to, being performed in parallel by multiple separate processors of the computing device 700.

The process 500 begins at block 502. In some embodiments, the process 500 can begin upon receipt of training data. In some the process 500 can begin upon initialization by a user.

At block 504, the computing device 700 can obtain training data for target and source tasks. In some embodiments, all or portions of training data can be stored locally on the computing device 700. In some embodiments, all or portions of training data can be obtained via a network 306 from a training database 308. In some embodiments, training data for the target task and/or the source task can be obtained from a user or client via a network. In some embodiments, the training data for a single source task can be used for multiple target tasks.

At block 506, training data can be grouped to create sets of input vectors, or batches, of source task training data and batches of target task training data. In some embodiments, the batches are shuffled among the source and target tasks to enable the training to alternate randomly between the two sets of training data. For example, a pseudo random number generator may be used to determine, for any given iteration of the process 500, whether to use a batch of source task training data or a batch of target task training data. In some embodiments, the model can be trained for the source task and target task separately by not combining the training data for the source task and target task randomly. For example, batches of source task training data and target task training data may be used according to a predetermined or dynamically determined schedule. As another example, all of one type of training data, such as source task training data, may be used before any of the other type of training data, such as the target task training data.

At block 508, the computing device 700 can perform a forward pass with the input batch through the dynamic transfer network. The input batch is passed through each neural network for the target task or the source task, depending upon the type of training data being used, to obtain outputs for the respective task. In other words, the input batch is multiplied by matrices representing the parameters associated with each neural network of the target or source task, is processed using functions associated with the respective task, etc. In some embodiments, the applied functions for the target and source tasks can be the same. In some embodiments, the applied functions for the target and source tasks can be different. In some embodiments, the applied functions correspond to a character encoder, word encoder, and/or a decoder/tagger.

At decision block 510, the computing device 700 can determine whether or not a stopping criterion is satisfied. In some embodiments, the outputs for each task can be compared to the expected output for each task. If a desired measurement of accuracy has been achieved, the stopping criterion may be considered satisfied. For example, the decision regarding whether or not the stopping criterion is satisfied is based on whether the difference between the computed output and the expected output is less than a threshold. If so, the models are determined to have converged and the stopping criterion may be considered satisfied. In some embodiments, the threshold can be adjusted. In some embodiments, the stopping criterion may relate to additional or alternative operational parameters, such as the maximum number of iterations of the process 500 to be executed, the maximum amount of elapsed time to execute the process 500, the total amount of training data to be used, other criteria, or some combination thereof. If the stopping criterion is satisfied, the process proceeds to block 514 where the training is completed. Otherwise, the process proceeds to block 512.

At decision block 512, the computing device 700 can adjust the parameters based on the results of the current iteration of the process 500. The parameters may be adjusted using one or more loss functions. In some embodiments, the parameters can be adjusted according to a cross-entropy loss function. In some embodiments, the parameters can be adjusted to minimize the cross-entropy loss of both the target and source task. In some embodiments, the parameters can be adjusted to minimize the total loss of the dynamic transfer network wherein the total loss of the dynamic transfer network accounts for a weighted loss associated with the soft-sharing scheme. In some embodiments, the total loss of the dynamic transfer network can be represented by functions [9] and [10]:

$$L_{CE} = L_{target} + L_{source} \quad [9]$$

$$L = L_{CE} + \lambda L_{share}, \quad [10]$$

wherein $L_{target}$ represents the cross entropy of the target task, $L_{source}$ represents the cross entropy of the source task, $\lambda L_{share}$ represents the weighted cross entropy associated with the soft-sharing scheme. After the parameters are adjusted, the process returns to block 506 to select another input batch.

Figure 6:
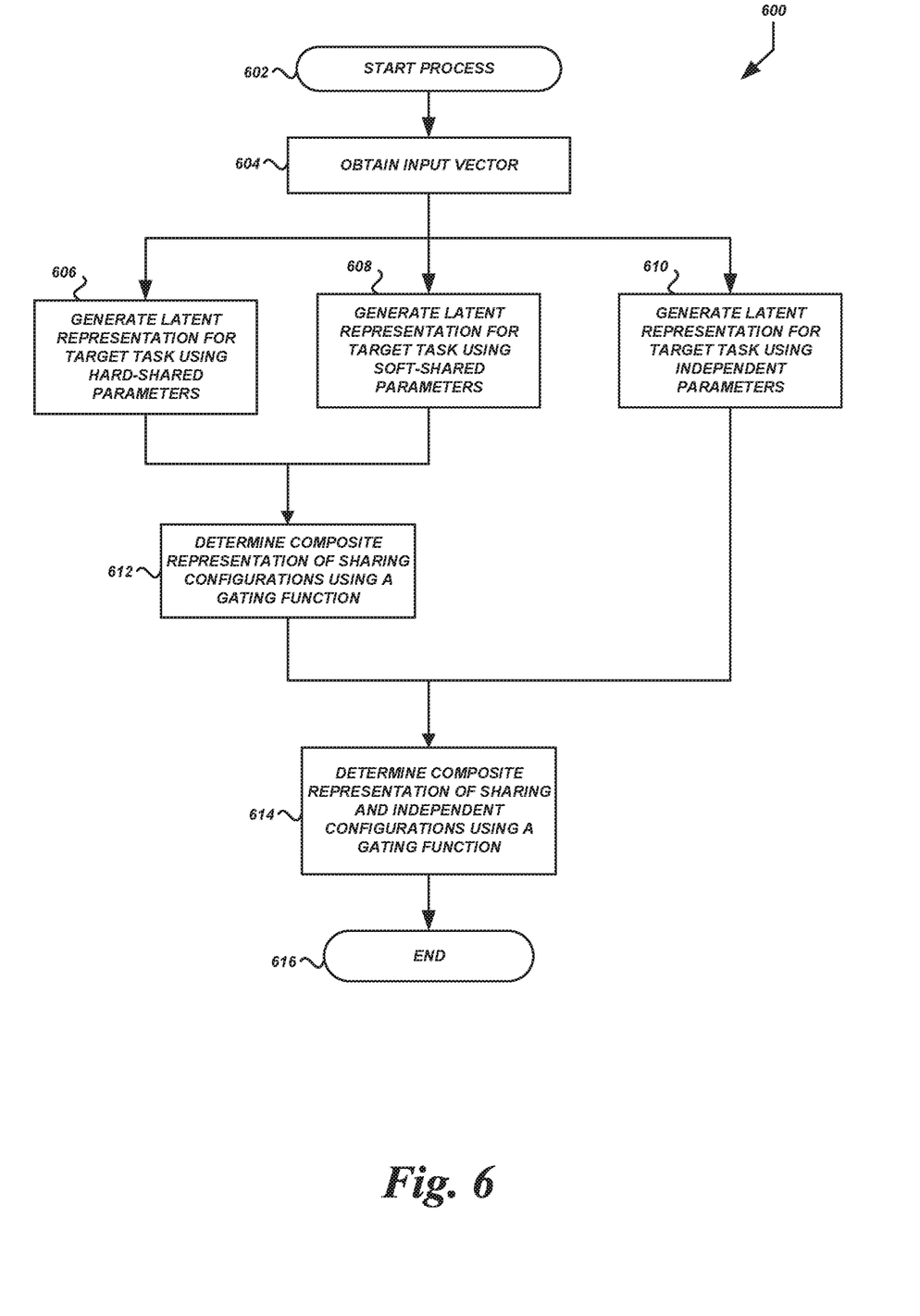
FIG. 6 is a flow diagram of an illustrative process for implementing gating mechanisms for a dynamic transfer network.

FIG. 6 is a flow diagram of an illustrative process for implementing gating mechanisms for a dynamic transfer network. In some embodiments process 600 can be used to perform a forward pass through neural network model associated with the target task. As depicted in FIG. 6, the process 600 comprises two blocks 612, 614 associated with gating mechanisms. In some embodiments, the process 600 can comprise one or more than two gating mechanisms based on the number of sharing schemes implemented by the process 600. In some embodiments, the gating mechanisms may be arranged according to a hierarchical gating architecture. Processing input using such a hierarchical gating architecture may involve combining multiple latent representations using two or more gating functions arranged in a hierarchical manner (e.g., rather than combining latent representations using a single gating function). For example, a process 600 performed using a hierarchical gating architecture that combines a plurality of latent representations may involve combining subsets of latent representations using a gating mechanism, and combining the output of the gating mechanism with the output of another gating mechanism and/or with another latent representation that has not yet been combined using any gating mechanism. In some embodiments, the hierarchical gating architecture comprises multiple iterations of combining subsets.

Although FIG. 6 will be described with respect to the target task, it will be appreciated that operations performed with respect to the source task may also or alternatively be performed (e.g., during the processing of source task batches, as described in greater detail above). In some embodiments, the process 600 can be used to perform a forward pass through a neural network model associated with the source task. In such embodiments, block 610 implementing the independent parameter scheme can be omitted when it will not affect the training of the target task. Omitting the independent parameter scheme of the source task can thus improve efficiency of the overall training process.

The process 600 may be embodied in a set of executable program instructions stored on a non-transitory computer-readable medium, such as one or more disk drives, of a computing device, such as the computing device 700 shown in FIG. 7 and described in greater detail below. When the process 600 is initiated, the executable program instructions can be loaded into memory, such as RAM, and executed by one or more processors of the computing device 700. Although the process 600 is described with respect to the computing device 700 shown in FIG. 7, the description is illustrative only and is not intended to be limiting. In some embodiments, the process 600 or portions thereof may be performed in parallel by multiple separate computing devices instead of, or in addition to, being performed in parallel by multiple separate processors of the computing device 700.

The process 600 begins at block 602. In some embodiments, the process 600 can begin upon receipt of an input vector or batch.

At block 604, the computing device can obtain an input vector. The input vector can be an input batch corresponding to the target or the source task. The process 600 can proceed to blocks 606, 608, and 610. In some embodiments, blocks 606, 608, and 610 occur in parallel. In some embodiments, all or some of the blocks 606, 608, and 610 can occur in series in any order.

At block 606, the computing device 700 can generate a latent representation for the target task using hard-shared parameters. In some embodiments, generating a latent representation $h_{t\text{-}hard}$ for the target task using hard-shared parameters comprises multiplying the input vector by a matrix of parameters that are hard-shared with the source task and applying an activation function. The multiplication by parameter matrices, the application of activation functions, and the like may continue as needed for each layer of the neural network. In some embodiments, the latent representation can be latent representation output of a character encoder, word encoder, or a decoder/tagger.

At block 608, the computing device 700 can generate a latent representation for the target task using soft-shared parameters. In some embodiments, generating a latent representation $h_{t\text{-}soft}$ for the target task using soft-shared parameters comprises multiplying the input vector by a matrix of parameters that are soft-shared with the source task and applying an activation function. The multiplication by parameter matrices, the application of activation functions, and the like may continue as needed for each layer of the neural network. In some embodiments, the latent representation can be latent representation output of a character encoder, word encoder, or a decoder/tagger.

At block 610, the computing device 700 can generate a latent representation for the target task using independent parameters. In some embodiments, generating a latent representation $h_{ind}$ for the target task using independent parameters comprises multiplying the input vector by a matrix of independent parameters that are not shared with the source task and applying an activation function. The multiplication by parameter matrices, the application of activation functions, and the like may continue as needed for each layer of the neural network. In some embodiments, the latent representation can be latent representation output of a character encoder, word encoder, or a decoder/tagger.

At block 612, the computing device 700 can determine a composite representation $o_{shared}$ of the sharing configurations using a gating mechanism or function 212. In some embodiments, the computing system 700 can combine latent representations $h_{t\text{-}hard}$ and $h_{t\text{-}soft}$ using one or more weighting values that minimize the overall loss of the model. In some embodiments, the computing system 700 combines the latent representations $h_{t\text{-}hard}$ and $h_{t\text{-}soft}$ and produces a composite representation $o_{shared}$ according to functions [1] and [2] discussed above.

At block 614, the computing device 700 determines a composite representation $o_{target}$ of the sharing configurations using a gating mechanism or function 214. In some embodiments, the computing system 700 can combine composite representation $o_{shared}$ and latent representation $h_{ind}$ using one or more weighting values that minimize the overall loss of the model. In some embodiments, the computing system 700 combines the composite and latent representations $o_{shared}$ and $h_{ind}$ and produces a composite representation $o_{target}$ according to functions [3] and [4] discussed above. The result $o_{target}$ can be used in block 510 as depicted in FIG. 5 to determine whether a stopping criterion has been satisfied.

Example Content Provider Computing System

FIG. 7 is block diagram of various components of a computing device according to some embodiments. FIG. 7 shows components of an illustrative content provider 100 computing device 700. In some embodiments, as shown, the computing device 700 may include: one or more computer processors 702, such as physical central processing units (CPUs); one or more network interfaces 704, such as a network interface cards (NICs); one or more computer readable medium drives 706, such as a high density disk (HDDs), solid state drives (SDDs), flash drives, and/or other persistent non-transitory computer-readable media; and one or more computer readable memories 708, such as random access memory (RAM) and/or other volatile non-transitory computer-readable media. The computer readable memory 708 may include computer program instructions that the computer processor 702 executes in order to implement one or more embodiments. For example, the computer readable memory 708 can store an operating system 710 that provides computer program instructions for use by the computer processor 702 in the general administration and operation of the computing system 300 configured to train neural networks and to perform tasks. The computer readable memory 708 may also include neural network training instructions 712 for training the dynamic transfer network 100. The computer readable memory 708 may also include application instructions 714 for implementing various neural network systems, for example, a named entity recognition system 400.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method for neural network training using multiple parameter sharing configurations, the computer-implemented method comprising:
under control of a computer system comprising a plurality of computer processors, the computer system configured to execute specific computer-executable instructions stored on a non-transitory computer memory,
obtaining data defining an artificial neural network associated with a source task, wherein the artificial neural network comprises a set of source task parameters;
generating a first latent representation by processing an input vector using a first version of the artificial neural network comprising a first set of target task parameters, wherein the first set of target task parameters is based on the set of source task parameters using a hard sharing configuration in which a value of a parameter in the set of source task parameters has a same value as a corresponding parameter in the first set of target task parameters;
generating a second latent representation by processing the input vector using a second version of the artificial neural network comprising a second set of target task parameters, wherein the second set of target task parameters is based on the set of source task parameters using a soft sharing configuration in which a change to a value of a parameter in the set of source task parameters is associated with a change to a value of a corresponding parameter in the second set of target task parameters;
generating a third latent representation by processing the input vector using a third version of the artificial neural network comprising a third set of target task parameters, wherein the third set of target task parameters is independent from the set of source task parameters;
generating a first composite representation by combining the first latent representation and the second latent representation based on a first weighting value generated using a first gating function;
generating a second composite representation by combining the first composite representation and the third latent representation based on a second weighting value generated using a second gating function;
adjusting the first, second, and third sets of target task parameters based on a comparison of the second composite representation and an expected output associated with the input vector; and
processing unlabeled text to identify named entities based on the first, second, and third versions of the artificial neural network comprising the adjusted first, second, and third sets of target task parameters.

2. The computer-implemented method of claim 1, further comprising adjusting a set of trainable parameters associated with at least one of the first or second gating functions using a loss function.

3. The computer-implemented method of claim 1, wherein the first gating function generates the first weighting value based on the first latent representation, the second latent representation, the input vector, and a bias factor.

4. The computer-implemented method of claim 1, wherein the second gating function generates the second weighting value based on the first composite representation, the third latent representation, the input vector, and a bias factor.

5. The computer-implemented method of claim 1, wherein adjusting the first, second, and third sets of target task parameters based on the comparison of the second composite representation and the expected output comprises minimizing a cross entropy associated with a target task, a cross entropy associated with a shared task, and a cross entropy associated with the soft sharing configuration.

6. The computer-implemented method of claim 1, wherein the neural network is implemented as a part of a named entity recognition system comprising a character encoder, a word encoder, and a decoder/tagger.

7. A system comprising:
non-transitory computer-readable memory storing executable instructions; and
one or more processors in communication with the non-transitory computer-readable memory and configured by the executable instructions to at least:
obtain data defining an artificial neural network associated with a source task, wherein the artificial neural network comprises a set of source parameters;
generate a first latent representation by processing an input vector using a first version of the artificial neural network comprising a first set of parameters, wherein the first set of parameters is based on the set of source parameters using a first parameter sharing configuration;
generate a second latent representation by processing the input vector using a second version of the artificial neural network comprising a second set of parameters, wherein the second set of parameters is based on the set of source parameters using a second parameter sharing configuration;
determine a weighting value using the first latent representation, the second latent representation, and a set of transformation parameters; and
generate a composite representation using the weighting value, the first latent representation, and the second latent representation.

8. The system of claim 7, wherein the one or more processors are further configured by the executable instructions to adjust the first and second sets of parameters based at least partly on a comparison of the composite representation and an expected output associated with the input vector.

9. The system of claim 8, wherein the one or more processors are further configured by the executable instructions to process unlabeled text to identify entities based at least partly on the first version of the artificial neural network comprising the adjusted first set of parameters and the second version of the artificial neural network comprising the adjusted second set of parameters.

10. The system of claim 7, wherein the first parameter sharing configuration comprises a soft parameter sharing configuration in which a distance between the first set of parameters and the set of source parameters is minimized.

11. The system of claim 7, wherein the first parameter sharing configuration comprises a hard parameter sharing configuration in which the first set of parameters is same as the set of source parameters.

12. The system of claim 7, wherein the first parameter sharing configuration comprises an independent parameter sharing configuration in which changes to parameter values in the set of source parameters occur independently from changes to parameter values in the first set of parameters.

13. The system of claim 7, wherein the set of transformation parameters comprises a first matrix corresponding the first latent representation, a second matrix corresponding to the second latent representation, and a third matrix corresponding to the input vector.

14. The system of claim 13, wherein the executable instructions to determine the weighting value comprise executable instructions to at least:
  determine a first scalar value using the first matrix and the first latent representation;
  determine a second scalar value using the second matrix and the second latent representation; and
  determine a third scalar value using the third matrix and the input vector, wherein the weighting value is based on the first scalar value, the second scalar value, and the third scalar value.

15. The system of claim 7, wherein the one or more processors are further configured by the executable instructions to at least:
  generate a third latent representation by processing the input vector using a third version of the artificial neural network comprising a third set of parameters, wherein the third set of parameters is based on the set of source parameters using a third parameter sharing configuration; and
  generate a second composite representation using the composite representation, the third latent representation, and a gating function.

16. The system of claim 7, wherein the artificial neural network models at least one of a character encoder, a word encoder, or a decoder/tagger.

17. A computer-implemented method comprising:
  under control of a computer system comprising a plurality of computer processors, the computer system configured to execute specific computer-executable instructions stored on a non-transitory computer memory,
    generating a first latent representation by processing an input vector using a first version of a neural network comprising a first set of parameters;
    generating a second latent representation by processing the input vector using a second version of the neural network comprising a second set of parameters;
    generating a third latent representation by processing the input vector using a third version of the neural network comprising a third set of parameters; and
    generating an output vector by combining the first latent representation, the second latent representation, and the third latent representation based at least partly on a hierarchical gating architecture comprising a gating function that generates a weighting value based on the first latent representation, the second latent representation, and the input vector.

18. The computer-implemented method of claim 17, wherein generating the output vector based at least partly on the hierarchical gating architecture further comprises using a second gating function that generates a second weighting value based on the first composite representation, the third latent representation, and the input vector.

19. The computer-implemented method of claim 17, further comprising:
  determining a first scalar value using the first latent representation and a first matrix from a first set of transformation parameters;
  determining a second scalar value using the second latent representation and a second matrix from the first set of transformation parameters;
  determining a third scalar value using the input vector and a third matrix from the first set of transformation parameters; and
  determining a weighting value based on the first scalar value, the second scalar value, and the third scalar value.

20. The computer-implemented method of claim 17, further comprising:
  generating the first set of parameters using a hard parameter sharing configuration;
  generating the second set of parameters using a soft parameter sharing configuration; and
  generating the third set of parameters using an independent parameter sharing configuration.

* * * * *

UNITED STATES PATENT AND TRADEMARK OFFICE
CERTIFICATE OF CORRECTION

PATENT NO. : 11,093,714 B1
APPLICATION NO. : 16/293459
DATED : August 17, 2021
INVENTOR(S) : Parminder Bhatia Page 1 of 1

It is certified that error appears in the above-identified patent and that said Letters Patent is hereby corrected as shown below:

In the Specification

In Column 5, Line 20, delete "in in" and insert -- in --.

In Column 6, Line 9, delete " $L_{share} = \mu \theta_{s\text{-}soft} - \theta_{t\text{-}soft}\|_2^2$ " and insert -- $L_{share} = \|\theta_{s-soft} - \theta_{t-soft}\|_2^2$ --.

In Column 7, Line 27, delete "g¬₁116" and insert -- g¬₁ 116 --.

In Column 14, Line 59, delete "(SDDs)," and insert -- (SSDs), --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*